United States Patent
Lucchetta (10) Patent No.: US 12,092,119 B2
(45) Date of Patent: Sep. 17, 2024

(54) LUBRICANT SUPPLY SYSTEM AND VACUUM PUMP

(71) Applicant: Edwards Limited, Burgess Hill (GB)

(72) Inventor: Emiliano Lucchetta, Burgess Hill (GB)

(73) Assignee: Edwards Limited, Burgess Hill (GB)

( * ) Notice: Subject to any disclaimer, the term of this patent is extended or adjusted under 35 U.S.C. 154(b) by 287 days.

(21) Appl. No.: 17/608,326

(22) PCT Filed: Apr. 27, 2020

(86) PCT No.: PCT/GB2020/051026
§ 371 (c)(1),
(2) Date: Nov. 2, 2021

(87) PCT Pub. No.: WO2020/225528
PCT Pub. Date: Nov. 12, 2020

(65) Prior Publication Data
US 2022/0220964 A1   Jul. 14, 2022

(30) Foreign Application Priority Data

May 3, 2019   (GB) ..................................... 1906248

(51) Int. Cl.
*F04D 19/04*   (2006.01)
*F04D 29/059*   (2006.01)
(Continued)

(52) U.S. Cl.
CPC ......... *F04D 19/042* (2013.01); *F04D 29/059* (2013.01); *F04D 17/168* (2013.01);
(Continued)

(58) Field of Classification Search
CPC .... F04D 19/042; F04D 29/063; F04D 29/056; F16C 2360/45
See application file for complete search history.

(56) References Cited

U.S. PATENT DOCUMENTS 3,614,261 A  * 10/1971  Friese ..................... F16C 33/74
                                                               384/135
3,877,546 A  *  4/1975  Shrader ................... F16N 7/366
                                                               184/6.18
(Continued)

FOREIGN PATENT DOCUMENTS

DE         2119857        11/1972
EP         2060794 A2      5/2009
(Continued)

OTHER PUBLICATIONS

British Examination Report dated Aug. 24, 2021 and Combined Examination Report dated Oct. 17, 2019 and Search Report dated Oct. 14, 2019 for corresponding British Application No. GB1906248. 8, 11 pages.

(Continued)

*Primary Examiner* — Michael A Riegelman
(74) *Attorney, Agent, or Firm* — Theodore M. Magee; Westman, Champlin & Koehler, P.A.

(57) ABSTRACT

Lubricant supply system comprising a lubricant container body defining a lubricant reservoir wherein the lubricant container body comprising an indentation of through-hole to receive a lubricant transfer device of a vacuum pump. Therein, the indentation of through-hole is surrounded by a collar extending from the lubricant container body.

19 Claims, 5 Drawing Sheets

(51) Int. Cl.
*F04D 17/16* (2006.01)
*F04D 29/058* (2006.01)
*F04D 29/063* (2006.01)

(52) U.S. Cl.
CPC .......... *F04D 29/058* (2013.01); *F04D 29/063* (2013.01); *F16C 2360/45* (2013.01)

(56) References Cited

U.S. PATENT DOCUMENTS

| | | | | |
|---|---|---|---|---|
| 4,286,829 | A * | 9/1981 | Heemskerk | F16C 33/7886 384/469 |
| 5,662,456 | A * | 9/1997 | Englander | F04D 29/056 417/423.4 |
| 2008/0112660 | A1 * | 5/2008 | Koch | F04D 29/0563 384/397 |
| 2015/0275902 | A1 * | 10/2015 | Patey | F04D 27/0292 415/118 |
| 2016/0097398 | A1 * | 4/2016 | Waye | F04D 29/058 415/110 |
| 2017/0102034 | A1 * | 4/2017 | Manabe | F16C 33/6681 |
| 2017/0227055 | A1 * | 8/2017 | Manabe | F16C 19/16 |
| 2018/0030990 | A1 * | 2/2018 | Rudge | F04D 19/042 |
| 2019/0383299 | A1 * | 12/2019 | Lucchetta | F04D 29/059 |
| 2021/0270280 | A1 * | 9/2021 | Lucchetta | F16C 33/6681 |
| 2021/0372421 | A1 * | 12/2021 | Milner | F04D 19/042 |
| 2022/0220964 | A1 * | 7/2022 | Lucchetta | F04D 29/059 |

FOREIGN PATENT DOCUMENTS

| | | |
|---|---|---|
| EP | 3674552 A2 | 7/2020 |
| GB | 2552700 A | 2/2018 |
| JP | 2017075695 A | 4/2017 |

OTHER PUBLICATIONS

International Search Report and the Written Opinion of the International Searching Authority, or the Declaration dated Jul. 1, 2020 and PCT Search Report dated Jul. 1, 2020 for corresponding PCT Application No. PCT/GB2020/051026.

European Communication dated Jan. 19, 2023 for corresponding European application Serial No. EP20723503.7, 6 pages.

* cited by examiner

LUBRICANT SUPPLY SYSTEM AND VACUUM PUMP

CROSS-REFERENCE OF RELATED APPLICATION

This application is a Section 371 National Stage Application of International Application No. PCT/GB2020/051026, filed Apr. 27, 2020, and published as WO 2020/225528 A1 on Nov. 12, 2020, the content of which is hereby incorporated by reference in its entirety and which claims priority of British Application No. 1906248.8, filed May 3, 2019.

The invention relates to lubricant supply systems to lubricate pump bearings and particularly, but not exclusively, to vacuum pump lubricant supply systems to lubricate a rolling bearing of a vacuum pump. Further, the present invention relates to a vacuum pump with such a lubricant supply system. Further, the present invention relates to a method for fabrication of such a lubricant supply system.

BACKGROUND

Many pumps comprise an impeller in the form of a rotor mounted on a rotor shaft for rotation relative to a surrounding stator. The rotor shaft is supported by a bearing arrangement that may comprise two bearings located at or intermediate respective ends of the shaft. One or both of these bearings may be a rolling bearing. The upper bearing may be in the form of a magnetic bearing and the lower bearing is a rolling bearing. This arrangement may be used in vacuum pumps such as, for example, turbomolecular vacuum pumps.

A typical rolling bearing comprises an inner race fixed relative to the rotor shaft, an outer race and a plurality of rolling elements located between the races for allowing relative rotation of the inner race and the outer race. To prevent mutual contact between the rolling elements they are often guided and evenly spaced by a cage. Adequate lubrication is essential to ensure accurate and reliable operation of rolling bearings. The main purpose of the lubricant is to establish a load-carrying film separating the bearing components in rolling and sliding contact in order to minimize fiction and wear. Other purposes include the prevention of oxidation or corrosion of the bearing components, the formation of a barrier to contaminants and the transfer of heat away from the bearing components. The lubricant is generally in the form of either oil or grease.

Pumps using oil-lubricated bearings require an oil feed system to feed oil between the contact areas of the bearing, which enables the oil to perform cooling as well as lubrication and thereby permit the bearings to run at a faster speed. Turbo-molecular vacuum pumps have traditionally used a wicking system for supplying oil to a rolling bearing. In such a system, a felt wick supplied by an oil reservoir feeds oil to a conical feed nut mounted on the shaft as lubricant transfer device. When the shaft rotates, oil travels along the conical surface of the nut to the bearing. The oil then passes through the bearing and is returned to the reservoir.

The oil reservoir from which the felt wick is supplied may comprise two stacks of layers of felt that lay against respective major surfaces of the felt wick so that the felt wick is sandwiched between the two stacks.

The feed rate of oil to the bearing may be affected by a number of factors, including the taper angle of the conical nut, the rate of transfer of oil from the wick to the nut, the surface finish of the conical surface of the nut, temperature and the speed of rotation of the shaft.

Thus, the position of the oil leaving the lubricant transfer device might vary and as a consequence the oil might not reach homogenously the respective bearing.

The discussion above is merely provided for general background information and is not intended to be used as an aid in determining the scope of the claimed subject matter. The claimed subject matter is not limited to implementations that solve any or all disadvantages noted in the background.

SUMMARY

Thus, it is an object of the present invention to provide a lubricant supply system ensuring reliable transfer of a lubricant to the bearing of a vacuum pump.

The lubricant supply system in particular for a vacuum pump in accordance to the present invention comprises a lubricant container body defining a lubricant reservoir. The lubricant reservoir containing a lubricant or oil to be fed to the bearing of a vacuum pump. Further, the lubricant container body comprises an indentation or through-hole to receive a lubricant transfer device of the vacuum pump. Thus, by the lubricant transfer device of the vacuum pump, lubricant is transferred from the lubricant reservoir of the lubricant container body to the bearing of the vacuum pump. Therein, the indentation or through-hole of the lubricant container body is at least partially surrounded by a collar extending from said lubricant container body. The collar might have the advantage that excess oil or lubricant is collected which drops of or is centrifuged from the lubricant transfer device during operation. Without the collar in accordance with the known prior art, oil dripping off from the lubricant transfer device of the vacuum pump before the intended delivery point in the bearing might return to the lubricant container body, if the vacuum pump is in an upright position. However, if the vacuum pump is in an inverted position oil or lubricant centrifuged from the lubricant transfer device drips into the bearing of the vacuum pump, which might result in increased oil churning losses. However, due to the foreseen collar in accordance to the present invention excess oil which is centrifuged away from the lubricant transfer device of the vacuum pump is collected by the collar and is not able anymore to drip into the bearing in an undesired and less controllable manner.

Preferably, the collar is completely surrounding the indentation or through-hole. Thus, excess oil dripping off from the lubricant transfer device of the vacuum pump in any direction can be collected by the additional collar.

Preferably, the lubricant container body comprises a porous material. In particular, the porous material might be made of a stable fibrous material or materials that are able to conduct lubricant by a capillary or wicking action. The fibrous material may be natural or synthetic and, in some examples, may be a felt material. Preferably the felt is a woven or unwoven material and/or a material with chemically bonded fibers. In general, the porous material absorbs the oil by capillary forces. Of course, the porosity must not be closed but interconnected between pores and open to the outside. The porous material thus stores the lubricant in the container body.

Preferably, the collar comprising a porous material in fluid communication with the lubricant container body. In particular, the porous material might be made of a stable fibrous material or materials that are able to conduct lubricant by a capillary or wicking action. The fibrous material may be natural or synthetic and, in some examples, may be a felt material. Thus, by a wicking action excess oil collected by the collar is fed back into the lubricant container body and might be reused and provided to the bearing of the vacuum pump.

Preferably, the lubricant supply system comprises at least one lubricant return member extending from the lubricant container body to return the lubricant after the lubricant has passed through the rolling bearing of the vacuum pump. If the vacuum pump is in an upright position all lubricant provided to the rolling bearing of the vacuum pump might be dripping back by gravity towards the lubricant container body and then recycled in a lubricant circulation. However, if the vacuum pump is in an inverted position the lubricant provided to the rolling bearing of the vacuum pump by the transfer device is then returned by the lubricant return member to the reservoir. In particular the at least one lubricant return member is also made of a porous material. In particular, the at least one lubricant return member is integrally formed with the lubricant container body. In particular, the lubricant supply system comprises more than one lubricant return member, wherein each lubricant return member is preferably formed as strip or finger extending from the lubricant container body beyond the position of the rolling bearing of the vacuum pump.

Preferably, the collar extends by more than 1 mm and less 20 mm from the lubricant container body. In particular, the collar extends from the lubricant container body by more than 1 mm and less than 10 mm and more preferably by more than 2 mm and less than 6 mm.

Preferably, the collar extends less from the lubricant container body than any of the lubricant return member.

Preferably, the lubricant supply system comprises a contactor connected to the lubricant container body to engage the lubricant transfer device of the vacuum pump in order to transfer lubricant or oil from the reservoir to the lubricant transfer device. The contactor might be a wicking element wherein the wicking element is made of porous material such as felt or the like. Further, the contactor might be sandwiched between two elements of the lubricant container body to receive a lubricant or oil from the reservoir of the lubricant container body.

Preferably, the contactor is made of a porous material extending radially into the indentation or through-hole and more preferably being made integral with the lubricant container body.

Preferably, the lubricant container body has an approximately annular shape wherein the indentation or though-hole might be arranged centrically.

Preferably, the lubricant container body has a first major surface and an opposite second major surface wherein the collar is extending from the first major surface and the indentation is defined in the first major surface or the through-hole is extending from the first major surface to the second major surface. Therein, the lubricant container body might have a cylindrical shape.

Preferably, the collar is made of a flat element by rolling up this flat element.

Preferably, the collar is connected to a plurality of strip elements extending radially from the collar. Therein, the strips elements might be formed by partial incisions of the flat element before rolling up the flat element.

Preferably, the strip elements are connected to the first major surface to fluidly connect the collar with the lubricant container body. Thus, excess oil or lubricant collected by the collar is fed back thought the strip elements to the lubricant container body and is recirculated. Alternatively, the strip elements are inserted and sandwiched by one of the elements of the lubricant container body stack or sandwiched between the contactor and one of the elements of the lubricant container body stack.

Preferably, the lubricant supply system comprises a housing wherein the lubricant container body is at least partially and more preferably completely enclosed by the housing. Therein, the collar is extending from the housing.

Preferably, the collar is connected to the housing by at least one web. However, in order to provide sufficient stability for the collar more than one web can be used to connect to the collar to the housing.

Preferably, the housing comprises at least one ring element surrounding and supporting the collar, wherein the ring element is connected to the housing by at least one web. Thus, by the ring element sufficient stability might be given to the collar.

Preferably, by the housing the lubricant supply system is formed as a cartridge which might be easy to implement to any existing vacuum pumps.

Further, an object of the present invention is to provide a vacuum pump. Therein, the vacuum pump might be a Siegbahn pump, a Gaede pump, a Holweck pump or, in general, a molecular-drag pump as well as a turbomolecular pump. The vacuum pump comprises a pump housing and a rotor shaft disposed in the pump housing having an axis of rotation. To the rotor shaft might be connected at least one pump element in order to convey a gaseous medium from an inlet of the vacuum pump to an outlet of the vacuum pump.

Further, the vacuum pump in accordance to the present invention comprises at least one rolling bearing for supporting the rotor shaft and allow fast rotation of the rotor shaft for pumping action. Further, the vacuum pump comprises a lubricant supply system as previously described. Preferably, at least one further bearing is built as magnetic bearing supporting the rotor shaft in a contact-free manner.

Further, the vacuum pump in accordance to the present invention comprises a lubricant transfer device mounted to the rotor shaft and extending into the indentation or through-hole of the lubricant supply system to receive lubricant from said lubricant supply system and to transfer the lubricant to the rolling ring.

Preferably, the collar is extending towards the rolling bearing. Thus, any lubricant or oil dripping off from the transfer device too early, such that it would not reach the rolling bearing, is collected by the collar and recirculated to the lubricant reservoir.

Preferably, the collar is not in contact with the rolling bearing and is also not in contact with the lubricant transfer device.

Preferably, between the collar and the rolling bearing a gap exists between 1 to 5 mm and preferably between 1 to 2 mm.

Preferably, the at least one lubricant return member of the lubricant supply system extend beyond the rolling bearing in order to return lubricant or oil that has been passed through the rolling bearing for recirculation.

Further, it is an object of the present invention to provide a method for fabricating a lubricant supply system.

The method comprises the steps of:
Providing a flat element, in particular from a porous material.
Cutting the flat element to provide a plurality of partial incisions, wherein the uncut part of the flat element has a width corresponding substantially to the height of the collar.
Further, in accordance to the present method, a housing for the lubricant supply system is provided.

The flat element is rolled up in order to form a circular collar.

The rolled-up flat element is inserted into the housing until the uncut part extends from the housing to form a collar extending from the housing in accordance to the present invention. Therein, the rolled-up flat element is preferably inserted into an opening of the housing from a side opposite to the direction in which the collar is extending from the housing.

In the next step the cut parts of the flat element are bent over to form strip elements in a radial direction.

As a last step a lubricant container body is provided and inserted into the housing being in contact with the strip elements of the previously inserted flat element.

Preferably, after inserting the collar into the housing and before inserting the lubricant container body into the housing, the collar might be fixed by a fixing element inserted into the housing from the same side as the collar. More preferably, the fixing element is interacting with a ring element of the housing to clampingly fix the collar into the housing.

Preferably, the lubricant supply system is built according to the features as described above.

The Summary is provided to introduce a selection of concepts in a simplified form that are further described in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

In the following disclosure reference will be made to the drawings, in which.

DETAILED DESCRIPTION

Figure 1:
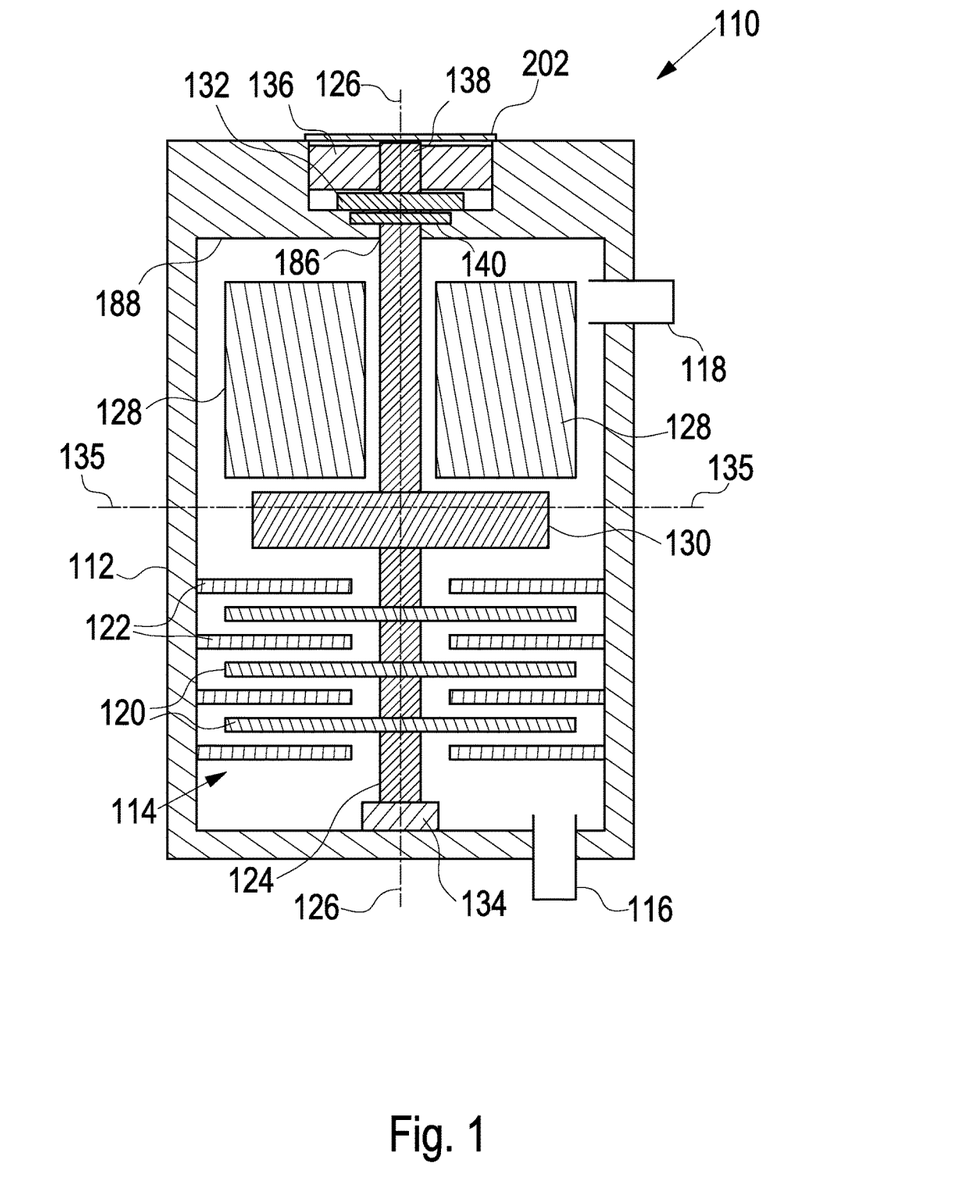
FIG. 1 is a schematic illustration of a turbomolecular pump in an inverted condition.

Referring to FIG. 1, a turbomolecular pump 110 comprises a housing 112, a pumping mechanism 114 disposed in the housing, an inlet 116 and an outlet 118. The pumping mechanism 114 may comprise a turbomolecular pumping mechanism comprising a plurality of rotor blades 120 disposed in interleaving relationship with a plurality of stator discs 122. The rotor blades 120 may be mounted on, or integral with, a rotor shaft 124 that has a longitudinal axis (axis of rotation) 126. The rotor shaft 124 is driven to rotate about the axis of rotation 126 by a motor 128 in order to convey a gaseous medium from an inlet 116 to an outlet 118 of the pump. The pumping mechanism 114 may additionally comprise a molecular drag pumping mechanism 130, which may be a Gaede mechanism, a Holweck mechanism or a Siegbahn mechanism. There may be additional, or alternative, mechanisms downstream of the molecular drag pumping mechanism such as an aerodynamic pumping mechanism comprising a regenerative mechanism.

The rotor shaft 124 is supported by a plurality of bearings 132, 134. The plurality of bearings may comprise two bearings 132, 134 positioned at, or adjacent, respective ends of the rotor shaft 124 as shown in FIG. 1, or alternatively, intermediate the ends. In the example illustrated by FIG. 1, a rolling bearing 132 supports a first end portion of the rotor shaft 124 and a magnetic bearing 134 supports a second end portion of the rotor shaft 124. A second rolling bearing may be used as an alternative to the magnetic bearing 134. When a magnetic bearing 134 is used, a back-up rolling bearing (not shown) may be provided. With reference to a datum 135 extending transverse to the longitudinal axis 126 and bisecting that axis at a location intermediate the bearings 134, when the turbomolecular pump 110 is in an inverted condition, the rolling bearing 132 is disposed above the datum 135. Although not essential, in the illustrated example, the longitudinal axis 126 is disposed perpendicular to the datum 135 and the rolling bearing 132 is disposed towards the top of the turbomolecular pump 110 and the bearing 134 is towards the bottom of the pump.

The turbomolecular pump 110 additionally comprises a lubrication system to lubricate the rolling bearing 132. The lubrication system may comprise a lubricant supply system 136 and a lubricant transfer device 138 provided on the rotor shaft 124 to transfer lubricant from the lubricant supply system to the rolling bearing 132.

Figure 2:
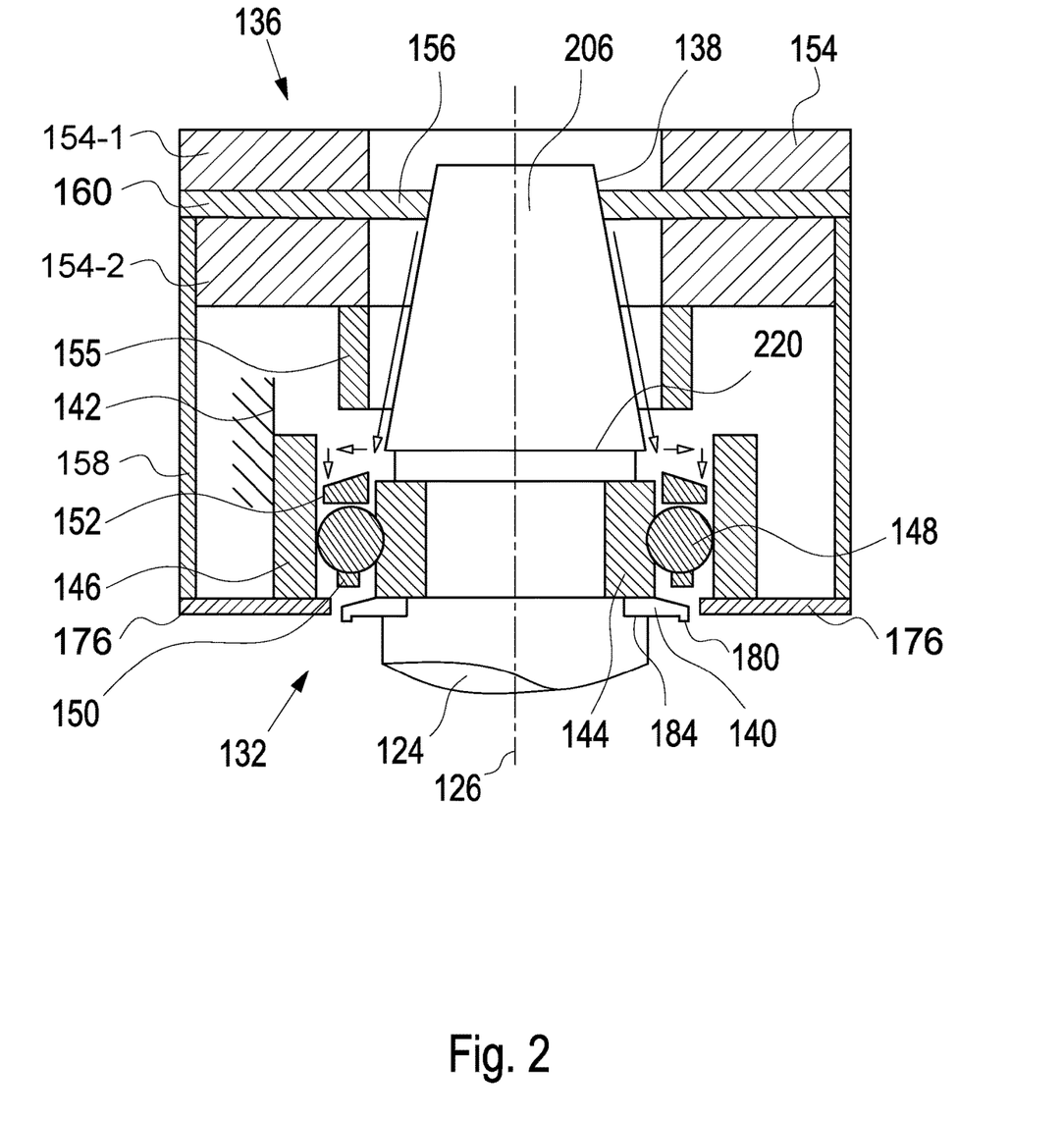
FIG. 2 is a cross-section detailed view of a lubricant supply system of the turbo-molecular vacuum pump of FIG. 1.

Referring to FIG. 2, the rolling bearing 132 is provided between the first end portion of the rotor shaft 124 and a bearing housing 142 of the turbomolecular pump 110. The bearing housing 142 may be integral with the housing 112 or a component fitted to the housing. As best seen in FIG. 2, the rolling bearing 132 comprises an inner race 144 fixed relative to the rotor shaft 124, an outer race 146 fixed relative to the bearing housing 142, a plurality of rolling elements 148 disposed between the inner and outer races and a cage 150 that is configured to provide a desired spacing between the rolling elements. The cage 150 is piloted on its outer diameter so that the cage pilot land 152 is disposed in face-to-face relation with the outer race 146. The cage pilot land 152 may comprise an annular surface, which in the orientation of the pump 110 shown in FIG. 2 is disposed above the rolling elements 148. The rolling bearing 132 is configured to allow relative rotation of the inner and outer races 144, 146 so that it can support the rotor shaft 124 during rotation of the rotor shaft relative to the housing 112. The rolling bearing 132 is supplied with a lubricant from the lubricant supply system 136 to establish a load-carrying film that minimizes friction and wear in the bearing and provides support for the cage 150 by separating the rolling elements 148 from the inner and outer races 144, 146 and the cage and the cage pilot land 152 from the outer race. The lubricant is liquid and may be an oil.

As best seen in FIG. 2, the lubricant supply system 136 may comprise a lubricant container body 154 built by two lubricant container body portions 154-1, 154-2 containing a lubricant reservoir, one or more contactors 156 (embodied as fingers 156 in FIG. 2) projecting inwardly of the lubricant container body 154 to engage the lubricant transfer device 138 and one or more lubricant return members 158. In use, lubricant from the lubricant reservoir flows to the lubricant transfer device 138 via the one or more fingers 156 and is transferred by the lubricant transfer device 138 to the rolling bearing as indicated by the arrows in FIG. 2. Lubricant that has passed through the rolling bearing 132 is returned to the lubricant reservoir via the one or more lubricant return members 158. The or each finger 156 and the or each lubricant return member 158 may be connected by an integral body member 160. For the sake of simplicity, in the description that follows, reference will be made to just one finger 156 and one lubricant return member 158, although, it is to be understood that this is not to be taken as limiting.

Figure 3:
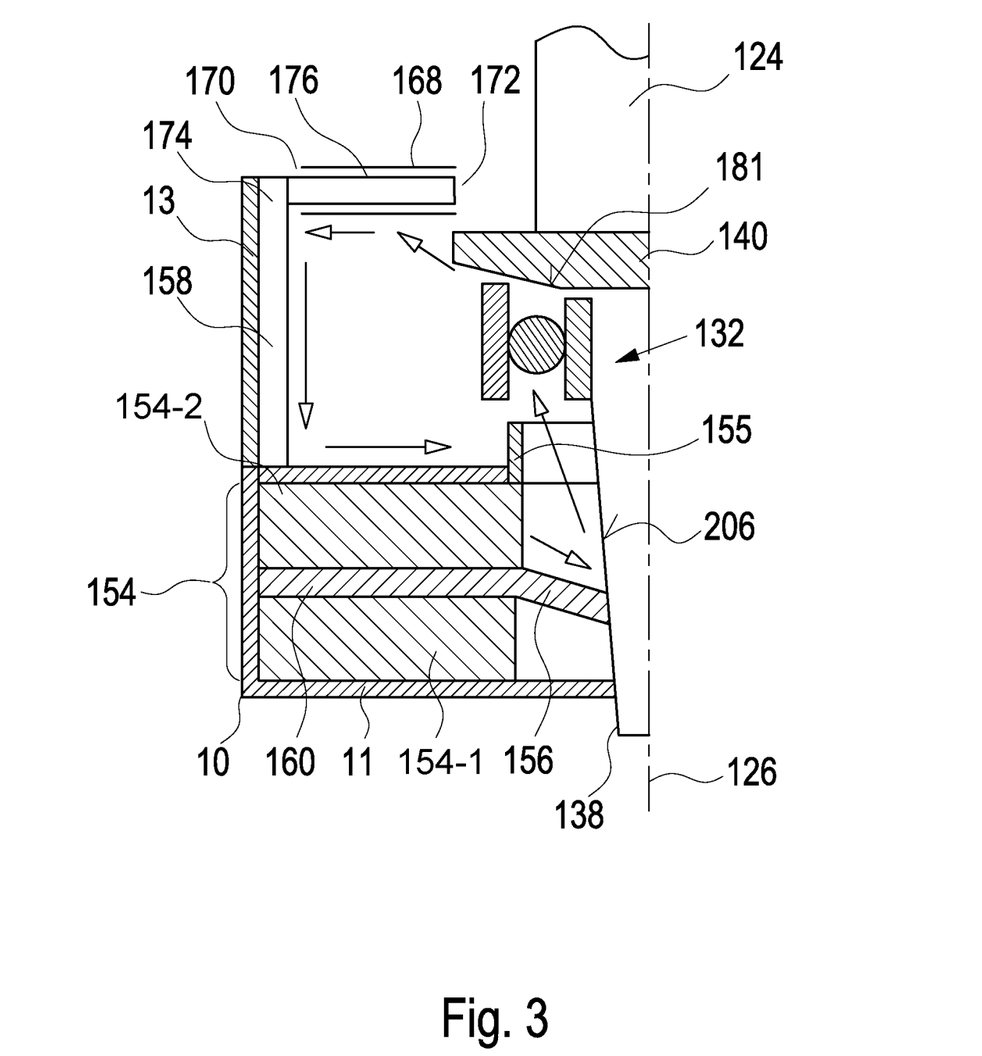
FIG. 3 is an enlarged schematic portion of FIG. 2, FIGS. 4A and 4B are different embodiments of the lubricant supply system in accordance to the present invention.

Referring to FIG. 3, the lubricant supply system 136 may further comprise a collection channel 168 that is configured to receive lubricant that has been supplied to the rolling bearing 132 via the lubricant transfer device 138 and then passed through the bearing. The collection channel 168 has a downstream end 170 and an upstream end. An upstream end 174 of the lubricant return member 158 may be disposed at or adjacent the downstream end 170 of the collection channel 168 to receive and return lubricant from the collection channel 168 to the lubricant container body 154. An absorbent collector body 176 may be disposed in the collection channel 168.

Referring to FIG. 2, the lubricant supply system 136 may comprise a deflector 140 mounted on the rotor shaft 124. The deflector 140 may comprise a drip former 180 (FIG. 2) to prevent the flow of lubricant along the underside of the deflector (as viewed in FIG. 2) towards the rotor shaft 124. As shown, the drip former 180 comprises a depending annular skirt, although, it may take many other forms such as an annular groove in the underside of the deflector. The deflector 140 may be mounted on the rotor shaft 124 such that the rolling bearing 132 is disposed between the deflector and the lubricant transfer device 138. The positioning of the deflector 140 is such that lubricant that has passed through the rolling bearing 132 may impinge on the deflector. The deflector 140 is configured to deflect lubricant that has passed through the rolling bearing 132 into the collection channel 168. The deflector 140 may be seated on a shoulder 184 defined by a reduced diameter section of the rotor shaft 124. The shoulder 184 may be disposed adjacent a bore provided in a partition 188 that separates the pumping mechanism 114 and motor 128 from the rolling bearing 132. The partition 188 may be an integral part of the housing 112 or an element fitted into and secured to the housing 112. The deflector 140 is configured to shield the bore against the ingress of lubricant that has passed through the rolling bearing 132 and deflect, or divert, the lubricant into the collection channel 168.

In the illustrated examples the deflector 140 is mounted on the rotor shaft 124. In some examples, a deflector may be provided on rolling bearing, for example on the inner race.

Referring to FIG. 3, the lubricant supply system 136 may comprise a housing 10 to hold the lubricant container body 154, lubricant return member 158 and body member 160 in an assembled condition. The housing 10 may comprise a main housing body 11 configured to receive the container body portions 154-1, 154-2 and body member 160 and a return member holder body 13 that may be integral with the main housing body 11, secured to the main housing body or disposed in the turbomolecular vacuum pump 110 such that it abuts the inner end of the main housing body. The return member holder body 13 may be an elongate body defining a lengthways extending channel configured to receive and support the lubricant return member 158. Although not essential, the housing may comprise one or more plastics moldings or is made by a 3D-printing process.

The housing 10 may be received in a recess 200 provided at an end of the housing 112. The inner end of the recess 200 may be at least in part defined by the partition 188. The rolling bearing 132 is housed in the recess 200. The housing 10 may be held in place in the recess 200 by an end cap 202 that may be secured to the housing 12 by bolts, clamps, screws or any other suitable securing mechanism.

Referring to FIG. 2, the lubricant transfer device 138 may comprise a hollow frustoconical body secured to the rotor shaft 124. The lubricant transfer device 138 has a longitudinal axis that is coincident with the longitudinal axis 126 of the rotor shaft 124. The lubricant transfer device 138 has an outer surface 206 that tapers radially outwardly with respect to the longitudinal axis 126 as it approaches the rolling bearing 132. The rotor shaft 124 and lubricant transfer device 138 may be provided with male and female threads respectively to enable the lubricant transfer device to be screwed onto the rotor shaft in the manner of a nut. Alternatively, in some examples, the lubricant transfer device 138 may comprise a sleeve-like construction that is slid onto the rotor shaft 124 and secured to the rotor shaft by means of a nut, holt, screw or other suitable securing means, In other examples, the lubricant transfer device may be a solid body provided which a male thread at one end to screw into a female thread provided in an end of the rotor shaft.

Referring to FIG. 3, when the rotor shaft 124 rotates about the axis of rotation 126, lubricant transferred to the lubricant transfer device 138 via the finger 156 is moved along the tapered outer surface 206 of the lubricant transfer device and into the rolling bearing 132 as indicated by the arrows. Lubricant that passes through the rolling bearing 132 impinges on the first major surface 181 of the deflector 140, which deflects, or flings, the lubricant towards the collection channel 168 where it is absorbed by the collector body 176. The lubricant collected in the collector body 176 migrates to the downstream end 170 of the collection channel 168 by a capillary or wicking action and passes into the lubricant return member 158 via which it is returned to the reservoir of the lubricant container body 154. Thus, lubricant supplied to the rolling bearing 132 can be effectively returned to the lubricant reservoir for recirculation.

The collection channel 168 may be an annular channel, or passage that surrounds the rotor shaft such that the upstream end 172 of the collection channel is defined by the inner circumference of the annular channel and the downstream end 170 is defined by the outer circumference of the annular collection channel. In some examples, an annular collector body 176 may be fitted in the collection channel 168, in which case the upstream end of the lubricant return member 158 may about the collector body at or adjacent the outer periphery of the collector body. In some examples the absorbent collector body 176 may be omitted, in which case the upstream end 174 of the lubricant return member 158 may be disposed in the collection channel 168 such that, in use, it is in direct contact with lubricant pooling in the collection channel 168.

An additional collar 155 is connected to the lubricant container body 154 and surrounding the lubricant transfer device 138. Therein, the collar 155 is not in contact neither with the lubricant transfer device 138 nor with the rolling bearing 132. The collar 155 is also made from a porous material and is in fluid communication with the lubricant reservoir of the lubricant container body 154. Thus, if the vacuum pump 110 is in inverted position, oil or lubricant centrifuged away from the outer surface 206 of the lubricant transfer device 138 too far from the rolling bearing or before reaching the lower edge 220 of the lubricant transfer device 138, is collected by the collar 155 and recirculated to the lubricant reservoir of said lubricant container body 154. Thus, no excess oil or lubricant can drip into the rolling bearing 132 in an undesired way.

The lubricant container body 154, collar 155, finger 156, lubricant return member 158, body member 160 and collector body 176 (when provided) may be made of a stable fibrous material or materials that are able to conduct lubricant by a capillary or wicking action. The fibrous material may be natural or synthetic and, in some examples, may be a felt material. The lubricant container body 154, collar 155, finger 156, lubricant return member 158 and body member 160 may be made of the same fibrous material, although in some examples different fibrous materials may be used. Although not essential, one or both lubricant container body portions 154-1, 154-2 of the lubricant reservoir body may comprise a plurality of relatively thin layers of fibrous material stacked one upon another as shown in FIG. 2.

Figure 4A:
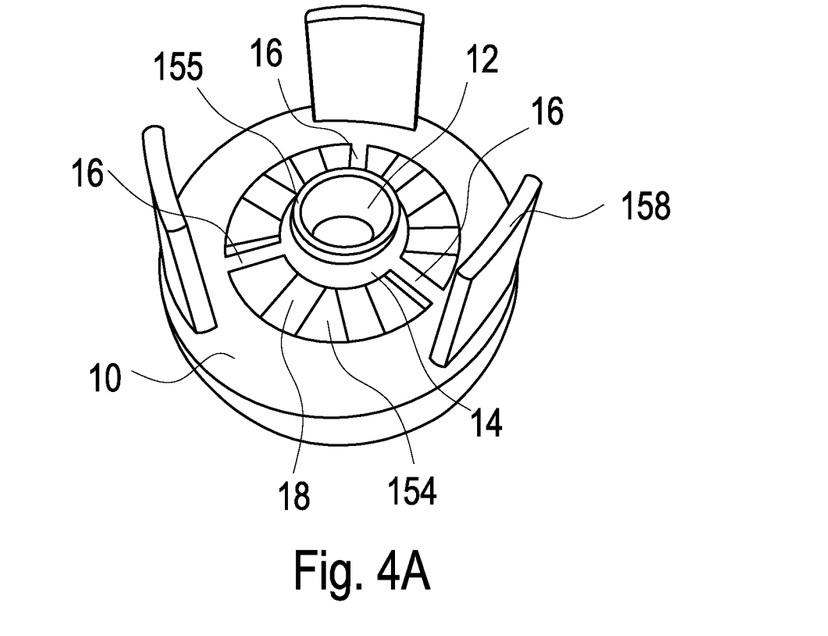

FIG. 4A shows a lubricant supply system in accordance to the present invention. The lubricant supply system is built as cartridge having an annular housing 10 containing the lubricant container body 154. The lubricant container body 154 comprises a through-hole 12, which is centrically arranged in order to receive the lubricant transfer device 138. The hole 12 is surrounded by the additional collar 155 that extends away from the housing 10 towards the rolling bearing 132, thereby surrounding the lubricant transfer device 138. Therein, the additional collar 155 is surrounded by a ring element 14, which is connected to the housing 10 by webs 16 providing sufficient stability to the additional collar 155. Further, the lubricant supply system of FIG. 4A shows three lubricant return members 158 extending also from the housing 10 of the lubricant supply system. Therein, the lubricant return member 158 extends beyond the rolling bearing 132, while the additional collar 155 extends towards the rolling bearing 132 but ends before the rolling bearing as shown in FIGS. 2 and 3.

FIG. 4A also shows strip elements 18 connected to the collar 155. The strip elements 18 are made from the material as the collar 155. The collar 155 is in fluid communication with the strip elements 18. Preferably collar 155 and the strip elements 18 are integrally formed or one piece. The excess oil or lubricant collected by the collar 155 is fed back to the lubricant reservoir of the lubricant container body 154 and recirculated.

Figure 5A:
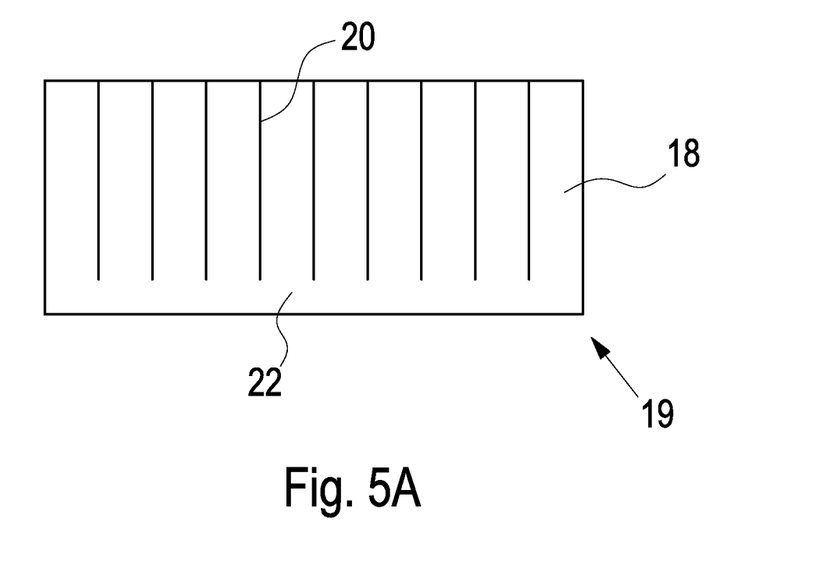
FIGS. 5A and 5B are elements during the process of fabrication.
Figure 5B:
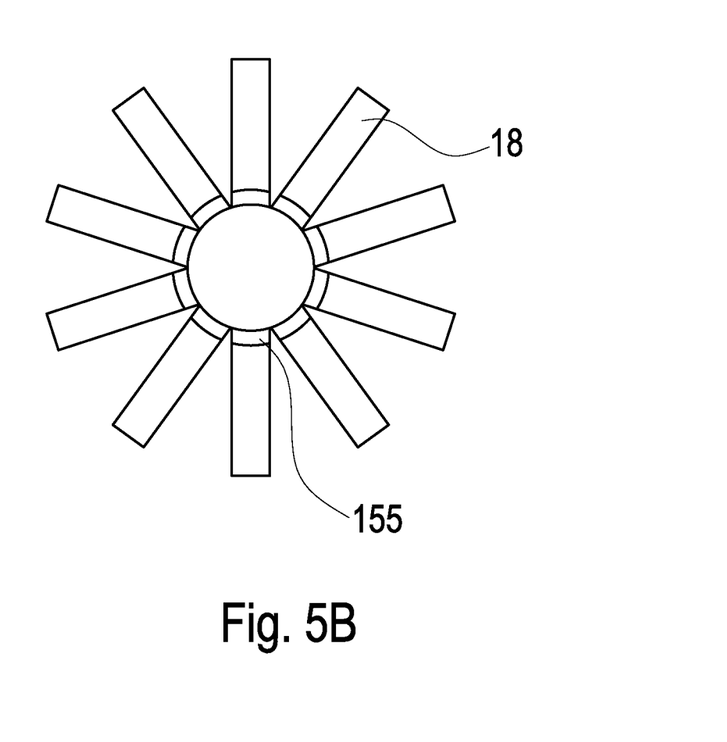

As best shown in FIG. 5A the collar and the strip elements are made from a single flat element 19, which is incised and provides a plurality of partial incisions 20 as well as an uncut part 22. The uncut part 22 will form the collar while the incised part forms the strip elements 18. After incising of the flat element 19, the flat element 19 is rolled up in order to form the collar 155 integrally connected to the strip elements 18 as shown in FIG. 5B by bending the cut parts outside by about 90 degrees.

Figure 4B:
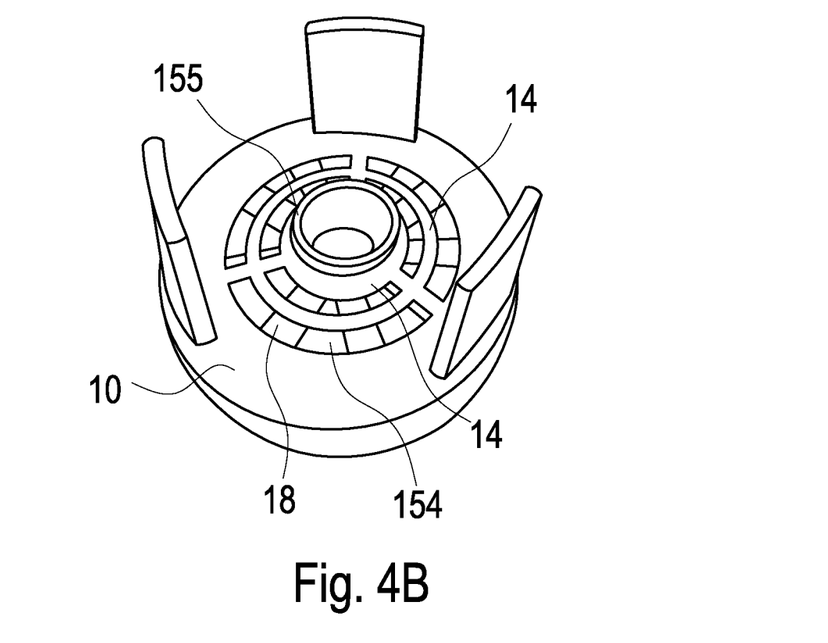

Referring back to FIG. 4B showing another embodiment of the lubricant supply system having a cartridge formed by a housing 10. Therein several ring elements 14 are used in order to stabilize the collar 155 as well as attaching the strip elements 18 to the lubricant container body 154 in order to maintain fluid communication between the reservoir of the lubricant container body 154 and the collar 155 via the strip elements 18.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are described as example forms of implementing the claims.

The invention claimed is:

1. A lubricant supply system comprising:
a lubricant container body defining a lubricant reservoir, the lubricant container body comprising an indentation or through-hole to receive a lubricant transfer device of a vacuum pump
wherein the indentation or through-hole is at least partially surrounded by a porous collar comprising a material that is capable of conducting lubricant through the material, the collar extending from said lubricant container body.

2. The lubricant supply system according to claim 1, characterized in that the collar is completely surrounding the indentation or through-hole.

3. The lubricant supply system according to claim 1, characterized in that the lubricant container body comprises a porous material.

4. The lubricant supply system according to claim 1, characterized in that the collar is in fluid communication with the lubricant container body.

5. The lubricant supply system according to claim 1, characterized by at least one lubricant return member extending from the lubricant container body to return lubricant.

6. The lubricant supply system according to claim 5, characterized in that the collar extends less from the lubricant container body than the lubricant return member.

7. The lubricant supply system according to claim 1, characterized in that the collar extends by more than 1 mm and less than 20 mm.

8. The lubricant supply system according to claim 1, characterized by a contactor to engage a lubricant transfer device to transfer lubricant from the reservoir to the lubricant transfer device, wherein the contactor is made of porous material extending radially into the indentation or through-hole and made integral with the lubricant container body.

9. The lubricant supply system according to claim 1, characterized in that the lubricant container body has an annular shape and the indentation or through-hole is arranged centrically.

10. The lubricant supply system according to claim 1, characterized in that the lubricant container body has a first major surface and an opposite second major surface, wherein the collar is extending from the first major surface and the indentation is defined in the first major surface or the through-hole is extending from the first major surface to the second major surface.

11. The lubricant supply system according to claim 1, characterized in that the collar is made of a flat element by rolling up.

12. The lubricant supply system according to claim 1, characterized in that the collar is connected to a plurality of strip elements extending radially from the collar, wherein the strip elements are formed by partial incisions of the flat element before rolling up the flat element.

13. The lubricant supply system according to claim 12, characterized in that the lubricant container body has a first major surface and an opposite second major surface, wherein the collar is extending from the first major surface and characterized in that the strip elements are connected to the first major surface to fluidly connect the collar with the lubricant container body.

14. The lubricant supply system according to claim 1, characterized by a housing wherein the lubricant container body is at least partially enclosed by the housing and the collar is extending from the housing, wherein the collar is connected to the housing by at least one web.

15. The lubricant supply system according to claim 14, characterized in that the housing comprises at least one ring element surrounding and supporting the collar, wherein the ring element is connected to the housing by at least one web.

16. The lubricant supply system according to claim 15, characterized in that the lubricant container body has a first major surface and an opposite second major surface and the ring element is arranged at the first major surface of the lubricant container body.

17. A vacuum pump, in particular a turbomolecular pump, comprising
- a pump housing;
- a rotor shaft disposed in the pump housing having an axis of rotation;
- a rolling bearing supporting said rotor shaft;
- a lubricant supply system according to claim 1 and
- a lubricant transfer device mounted to the rotor shaft and extending into the indentation or through-hole of the lubricant supply system to receive lubricant from the lubricant supply system and to transfer the lubricant to the rolling bearing.

18. The vacuum pump according to claim 17, characterized in the collar is extending towards the rolling bearing.

19. The vacuum pump according to claim 17, characterized in that the collar is not in contact with the rolling bearing and/or not in contact with the lubricant transfer device.

* * * * *